May 14, 1929.　　　F. R. McDOUGAL　　　1,712,893
ANIMAL TRAP
Filed March 14, 1928　　　2 Sheets-Sheet 1

Inventor
Floyd R. McDougal
By Clarence A. O'Brien
Attorney

May 14, 1929. F. R. McDOUGAL 1,712,893
ANIMAL TRAP
Filed March 14, 1928 2 Sheets-Sheet 2

Inventor
Floyd R. McDougal
By Clarence A. O'Brien
Attorney

Patented May 14, 1929.

1,712,893

UNITED STATES PATENT OFFICE.

FLOYD R. McDOUGAL, OF LACONA, NEW YORK.

ANIMAL TRAP.

Application filed March 14, 1928. Serial No. 261,653.

The present invention relates to animal traps and has for its prime object to provide a mechanism of this nature, wherein an animal is struck by a blow delivering member when said animal takes hold of the bait, said blow delivering member being actuated in such a manner as to instantly kill the animal.

Another very important object of the invention resides in the provision of an animal trap of this nature having a swingably mounted hammer urged by means of springs in one direction, and trip releasable means holding the hammer with the springs under tension, and means for setting the hammer in an easy manner without danger to the operator.

A still further very important object of the invention resides in the provision of a trap of this nature wherein the mechanism thereof is housed in a casing to be protected from the elements, said casing being constructed to afford convenient access to the mechanism therein.

A further general object of the invention resides in the provision of a trap of this nature, which is simple in its construction, compact in its arrangement of parts, strong and durable, comparatively inexpensive to manufacture, positive, reliable, and efficient in action, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

In the drawings:

Figure 4 is a perspective view of the trap setting member.

Figures 5 and 6 are perspective views of plates for association with the member shown in Figure 4.

Figure 7 is a perspective view of a fixed catch, forming part of the means for holding the trap set.

Figure 1:
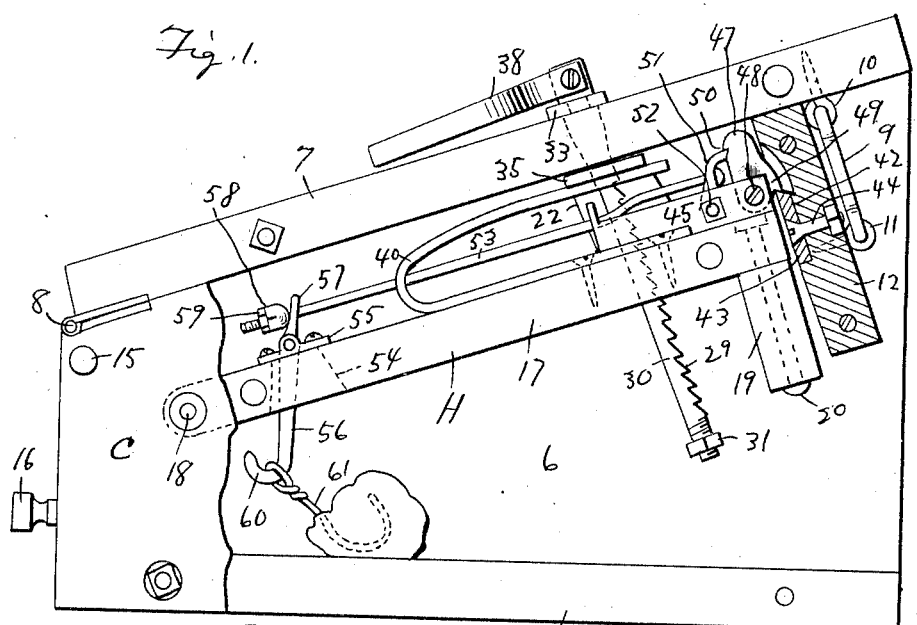
Figure 1 is a sectional side elevation of the features embodying my invention, showing one side wall broken away.

Referring to the drawing in detail, it will be seen that the letter C denotes generally a casing, which may be formed of any desired material and includes a bottom 5, a pair of side walls 6, rising from the longitudinal edges of the bottom, and the upper edges of these side walls incline downwardly and rearwardly. A top or roof 7 is hinged as at 8, to the side walls 6 at the lower ends of their upper edges, and is held closed by a hook 9, engageable between eye bolts 10 and 11, the former of which is mounted to depend from the roof 7 at the free end thereof and the latter of which is mounted in a cross bar 12 disposed between the side walls 6 adjacent their front and upper edges.

A door 14 is pivotally mounted, as at 15, between the rear upper corners of the side walls 6, for closing the rear of the casing. This door 14 may be swung outwardly to afford access to the casing, from the rear end, and preferably has a knob 16, mounted on the exterior face thereof.

A death dealing blow delivering member, in the nature of a hammer is denoted generally by the letter H. This hammer member H comprises an elongated arm 17, pivotally mounted, at one end, as at 18, between the side walls 6, adjacent the rear edges thereof and intermediate the upper and lower edges thereof. A striking head 19 depends from the free end of the arm 17, being attached to the arm by means of bolts 20 or in any other preferred or suitable manner. The arm 17 is provided with an opening 21 therethrough. A hood 22 is mounted on top of the arm 17 above the opening 21 and has an opening 23 in registry with the opening 21 and also a lateral opening 24. A pawl 25 is pivotally mounted, as at 26, between the bottom portions of the sides of the hood 22, and has an arcuate guide finger 27, projecting through the opening 24. A spring 28 is disposed about the finger and urges the pawl 25, into engagement with ratchet teeth 29, which are provided in a longitudinal series on one edge of a flat like bar 30, which extends through openings 21 and 29. A nut 31 is threadedly engaged on the bottom end of the bar 30, so that said bottom end may not be pulled all of the way through the opening 21, when the bar 30 is moved upwardly.

The roof 7 is provided with an opening 32, in registration with openings 21 and 23 when the roof is closed, and the bar 30 extends through this opening 32. The plate 33 is fixed to the upper surface of the roof 7 and has an oblong opening 34 in the center thereof extending transversely of the roof and in registration with the opening 32. A plate 35 is fixed to the under surface of the roof 7 and is of oblong construction and extends transversely of the roof and has a central opening 36 in registration with the opening 32. The bar 30 therefore extends through openings 34 and 36. Adjacent the upper end of the bar 30 there is provided a pair of notches 37, one at each end thereof for receiving the longitudinal edges of the oblong opening 34. A bail 38 is pivoted to the upper end of the bar 30. By turning the bar 90° it will be seen that the notches 37 may be disengaged from the plate 34, so that the bar may be pulled upwardly through the openings 34, 32 and 36, for setting the member H, from the position shown in Figure 2, to the position shown in Figure 1.

Figure 2:
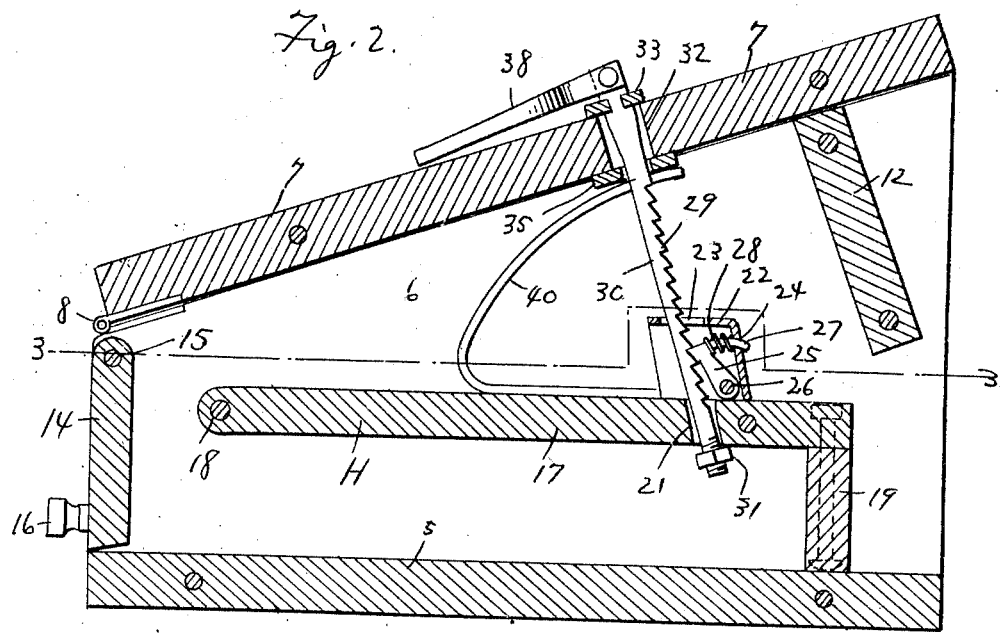
Figure 2 is a vertical longitudinal section through the trap, taken substantially on the line 2—2 of Figure 3.
Figure 3:
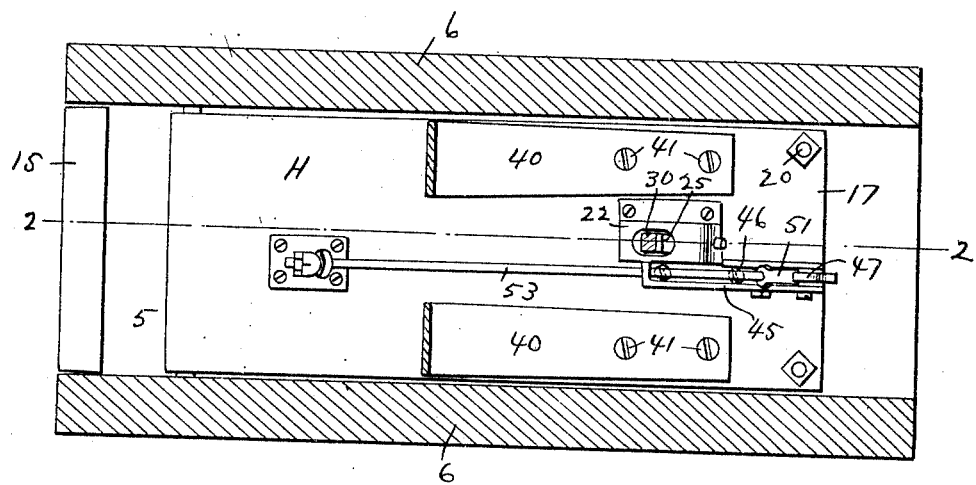
Figure 3 is a longitudinal horizontal section taken substantially on the line 3—3 of Figure 2.

A pair of curved leaf springs 40 are fixed to the upper surface of the arm 17 as at 41, adjacent the free end of said arm and extend rearwardly and then curve upwardly to have free ends bearing against the plate 35, for urging the member H downwardly to the position shown in Figure 2, and therefore when the member is in the set position shown in Figure 1, these springs are under considerable tension.

The member H when released will swing downwardly with sufficient force to kill the animal in the casing.

The rear face of the cross member 12 is provided with a recess 42, in which is mounted a catch plate 43, by means of a bolt 44, or in any other suitable manner. The upper edge of this catch plate 43 is bevelled downwardly and forwardly. This plate fills the lower portion of the recess. A plate 45 extends laterally from one side of the hood 22, and then forwardly and another plate 46 extends forwardly from the hood 22, in spaced parallelism to the plate 45. A catch member 47 is pivoted between the plates 45 and 46 at their forward ends as at 48, and has a portion 49 engageable with the bevelled end of the catch plate 43 and is provided with a notch 50 in which is adapted to engage a pawl 51 pivoted as at 52, between the plates 45 and 46. A rod 53 is engaged with the pawl 51 and is slidable through an opening in the lateral portion of the plate 45 and extends rearwardly to terminate adjacent the pivoted end of the arm 17. The pivoted end of the arm 17 is formed with an opening 54. A bearing plate 55 is secured to the upper surface of the arm 17, over the opening 54, and has a trigger 56 rockable therein. The upper end of the trigger is in the form of an eye 57, through which the rod 53 extends and an adjustable abutment 58 is held on the end of the rod 53 in different positions by means of a nut 59.

The lower end of the trigger 56 is in the form of a hook 60, with which may be engaged a bait holding instrument 61.

With the parts in the set position shown in Figure 1, it will be seen that when an animal enters the larger open end of the casing, under the cross member 12 and takes hold of the bait on the instrument 61 and pulls said instrument to rock the trigger 56 in a counter-clockwise direction, the rod 53 will be pulled rearwardly, releasing the pawl 51 from the pivoted catch member 47 and the springs 40 will swing the member H down swiftly, causing the catch member to rock out of engagement with the bevelled edge of the plate 43. The said head 19 will strike the animal and kill it. After the animal has been taken out, which may be accomplished by releasing the pawl 25 from the ratchet teeth 29, by the guide finger 27, the trap may be reset as follows. The operator grasps the bail 38 and turns the bar 30 to disengage the notches 37 from the plate 34 and pulls upwardly. The nut 31 engages the bottom of the arm 17 and swings the member H upwardly to the position shown in Figure 1, thus placing the springs 40 under tension and the roof 7 may be swung upwardly so as to properly set the catch 47, and the pawl 51, as will be quite apparent. The roof should then be locked in its closed position and the bar 30 shoved down to the position shown in Figure 1 and the notches 37 engaged with the edges of the opening 34.

It will be noted that when the trap has been sprung, the pawl 21 engaging the ratchet teeth 29 of the bar 30 prevents the animal from releasing itself. It is thought that the construction, operation and advantages of the invention will now be quite apparent to those skilled in this art without a more detailed description thereof. The present embodiment of the invention has been disclosed in detail merely by way of example, since in actual practice it attains the features of advantages enumerated as desirable in the statement of the invention and the above description.

It will be apparent that changes in the details of construction, and in the combination and arrangement of parts may be resorted to, without departing from the spirit or scope of the invention as hereinafter claimed or sacrificing any of its advantages.

Having thus described my invention, what I claim as new is:

1. In an animal trap, a casing comprising a bottom, side walls rising from the bottom, a roof hingedly mounted on the side walls, a door hingedly mounted between the side walls at one end of the casing, a blow delivering member in the casing, means for operating the member to deliver a blow, means in the casing for holding the operating means set, and means for releasing the holding means.

2. In an animal trap, a casing comprising a bottom, side walls rising from the bottom, a roof hingedly mounted on the side walls, a door hingedly mounted between the side walls at one end of the casing, a blow delivering member in the casing, means for operating the member to deliver a blow, means in the casing for holding the operating means set, means for releasing the holding means, a setting bar slidable through an opening in the roof, releasable means for holding the setting bar fixed to the roof, pawl and ratchet means between the setting bar and the member for holding the member against movement by an animal when struck thereby, and means on the bar for engaging the member so that when the bar is released from the roof, it may be pulled to reset the member.

3. In an animal trap, a casing, a hammer swingably mounted in the casing, a cross member in the casing, catch means between the hammer and the cross member for holding the hammer in a set position, spring means urging the hammer for striking a blow, trigger releasing means associated with the catch means, a bait instrument engaged with the trigger.

4. In an animal trap, a casing, a hammer swingably mounted in the casing, a cross member in the casing, catch means between the hammer and the cross member for holding the hammer in a set position, spring means urging the hammer for striking a blow, trigger releasing means associated with the catch means, a bait instrument engaged with the trigger, said hammer having an opening, a spring pressed pawl on the hammer, a ratchet bar slidable through the opening and engaged by the pawl for holding the hammer against movement when the same has struck an animal.

5. In an animal trap, a casing, a hammer swingably mounted in the casing, a cross member in the casing, catch means between the hammer and the cross member for holding the hammer in a set position, spring means urging the hammer for striking a blow, a trigger releasing means associated with the catch means, a bait instrument engaged with the trigger, said hammer having an opening, a spring pressed pawl on the hammer, a ratchet bar slidable through the opening and engaged by the pawl for holding the hammer against movement when the same has struck an animal, releasable means for engaging the bar with the casing, and means on the bar for engaging the hammer so that when the bar is released from the casing it may be pulled to reset the hammer.

In testimony whereof I affix my signature.

FLOYD R. McDOUGAL.